United States Patent
Peli et al.

(10) Patent No.: US 11,635,153 B2
(45) Date of Patent: Apr. 25, 2023

(54) SAFETY DEVICE FOR A GAS-CONDUCTING DEVICE

(71) Applicant: Truma Gerätetechnik GmbH & Co. KG, Putzbrunn (DE)

(72) Inventors: Claudio Peli, Torbole Casaglia (IT); Paolo Robolini, Torbole Casaglia (IT)

(73) Assignee: TRUMA GERÄTETECHNIK GMBH & CO. KG, Putzbrunn (DE)

( * ) Notice: Subject to any disclaimer, the term of this patent is extended or adjusted under 35 U.S.C. 154(b) by 251 days.

(21) Appl. No.: 17/266,434

(22) PCT Filed: Jul. 18, 2019

(86) PCT No.: PCT/EP2019/069419
§ 371 (c)(1),
(2) Date: Feb. 5, 2021

(87) PCT Pub. No.: WO2020/030405
PCT Pub. Date: Feb. 13, 2020

(65) Prior Publication Data
US 2021/0293342 A1  Sep. 23, 2021

(30) Foreign Application Priority Data
Aug. 9, 2018 (IT) .................. 102018000008012

(51) Int. Cl.
*F16K 17/36* (2006.01)
*F16J 3/02* (2006.01)
*G05D 16/06* (2006.01)

(52) U.S. Cl.
CPC ............ *F16K 17/363* (2013.01); *F16J 3/02* (2013.01); *G05D 16/0686* (2013.01)

(58) Field of Classification Search
CPC ....... F16K 17/363; F16J 3/02; G05D 16/0686
See application file for complete search history.

(56) References Cited

U.S. PATENT DOCUMENTS

| | | | |
|---|---|---|---|
| 4,007,643 A | 2/1977 | Matsushita | |
| 5,549,130 A * | 8/1996 | Schuster | ............ F16K 17/366 137/39 |
| 2006/0278269 A1 | 12/2006 | McGill | |
| 2007/0044845 A1 * | 3/2007 | Childers | ............ G05D 16/0686 137/505.47 |

FOREIGN PATENT DOCUMENTS

| | | |
|---|---|---|
| CN | 1195749 A | 10/1998 |
| CN | 103133736 A | 6/2013 |
| DE | 41594 A | 9/1965 |
| DE | 3509840 A1 | 10/1986 |

(Continued)

*Primary Examiner* — P. Macade Nichols
(74) *Attorney, Agent, or Firm* — Murphy, Bilak & Homiller, PLLC

(57) ABSTRACT

The invention relates to a safety device (2) for interrupting a gas flow within a gas-conducting device (1). An inertia body (32) moves from a resting position in the case of an acceleration above a specifiable acceleration threshold value acting on it. Due to the movement, the inertia mechanism (3) activates a reaction mechanism (4), which interrupts the gas flow within the gas-conducting device (1). In this process, the safety device (2) is free of gas flowing through it.

18 Claims, 9 Drawing Sheets

(56) References Cited

FOREIGN PATENT DOCUMENTS

Figure 1:
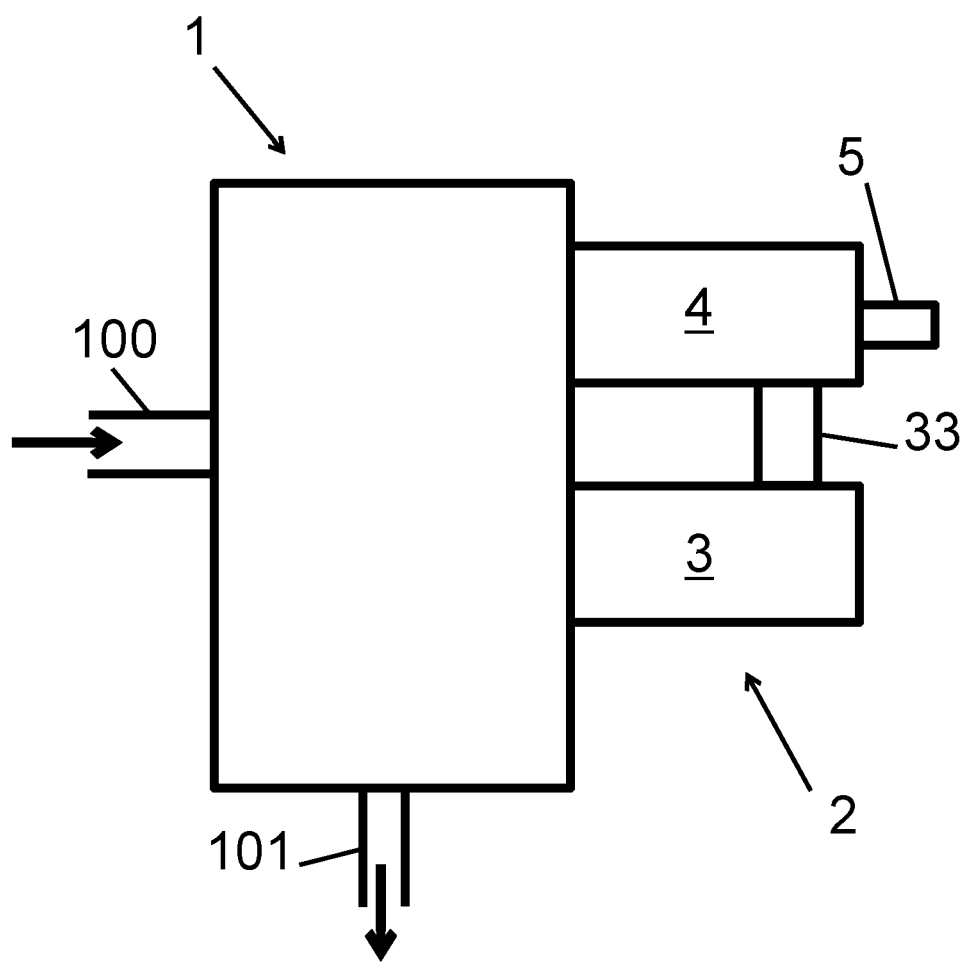

| | | |
|---|---|---|
| DE | 19532701 C2 | 1/2000 |
| DE | 19917468 C2 | 9/2001 |
| EP | 0037514 A1 | 10/1981 |
| EP | 2096340 B1 | 7/2010 |
| EP | 2853978 A1 | 4/2015 |
| GB | 1461993 A | 1/1977 |
| JP | S4997422 U | 8/1974 |
| JP | S5021123 U | 3/1975 |
| JP | S51113222 A | 10/1976 |
| JP | S51123921 A | 10/1976 |
| JP | S526229 U | 1/1977 |
| WO | 0198737 A1 | 12/2001 |

\* cited by examiner

SAFETY DEVICE FOR A GAS-CONDUCTING DEVICE

The present invention relates to a safety device for a gas-conducting device. The safety device, in particular, interrupts the gas flow within the device in the case of an external mechanical force.

In the prior art, various devices or, for example, valves are known, which interrupt the flow of a medium (an alternative designation is fluid), e.g. a liquid or a gas, in emergency cases or in specific exceptional situations. In this process, inertia bodies are often used, which, in the normal state, are in an unstable equilibrium and which, in the case that a force or acceleration above a specifiable threshold value acts on them, interrupt the flow of the medium. The threshold value for the acting force is, for example, set via spring elements.

DD 41 594 A describes a shut-off valve, which interrupts the flow in the case of a burst pipe. For this purpose, a ball and a spring are located in the area of the valve through which the medium flows.

EP 0 037 514 A1 shows a similar construction comprising a ball and a spring in the area through which a medium flows, wherein the application serves the purpose that no fuel escapes during a vehicle accident.

EP 2 096 340 B1 discloses a valve comprising a safety device through which a fluid flows. The safety device has an inertia body, an energy storage device, a movement means, and a sealing unit. In the normal state, the inertia body prevents the energy storage device from giving off energy to the movement means, and thus interrupts the flow of the fluid via the sealing unit. If the valve tilts, e.g. during an accident, the inertia body follows the movement and allows the energy storage device to transmit the energy stored to the movement means. The valve additionally has a readjusting device via which an operator can restore the sealing unit to the open state.

An arrangement comprising a gas pressure regulator and a shut-off valve can be taken from EP 2 853 978 A1. A ball is located in the valve, which, in a normal state, holds the valve body loaded with a spring force in a position so that gas can flow through the shut-off valve. If the valve tilts, then the ball moves, and the spring moves the valve body to a closing position. In this process, the gas flows through both the pressure regulator and the shut-off valve.

WO 01/98737 A1 describes a gas quantity measuring instrument comprising a safety mechanism in the case of an earthquake. A magnet acts on a sealing element located in an area through which a gas flows and thus holds the valve in an open state. The magnet is located in a holder that acts as an inertia body. If the holder moves in the case of a shock, then the attraction force of the magnet is no longer sufficient, and the sealing element falls off. The flow is thereby interrupted.

Different safety mechanisms are e.g. also shown by JP S49 97422 U, JP S51 123921 A, JP S50 21123 U, JP S52 6229 U, JP S51 113222 A or by GB 1 461 993 A.

In many application cases, the gas, as an example of the fluid, is routed through a gas pressure regulator (alternative designations are gas regulator or gas pressure regulating device), so that it has a predefined target pressure. The gas comes, for example, from a tank or a gas cylinder. Most of the time, the gas pressure regulator has an intermediate chamber through which the gas is routed. The intermediate chamber is sealed by a movable membrane on one side. The membrane or the pressure acting on the membrane on the other side is set dependent on the target pressure. If the applied gas pressure at which the gas flows through the intermediate chamber is smaller than the target pressure, then the membrane will reduce the volume of the intermediate chamber, and the gas pressure will increase. If, however, the applied gas pressure is, conversely, greater than the target pressure, then the membrane will increase the volume of the intermediate chamber, and the gas pressure will drop.

For example, two-stage gas pressure regulators are known. The first stage has a wide regulation range, and the second stage a high regulation quality (see, for example, DE 199 17 468 C2).

Most of the time, a plurality of parts is built into gas pressure regulators which also partly carry out movements against one another. In this process, care must be taken to ensure that the gas only flows through defined passages, so that it is necessary that ducts are partly sealed off. This can be particularly intricate if components are movable against one another.

From other fields, which do not relate to carrying gas, sealing components are known which also allow sealing against movable components (e.g. DE 195 32 701 C2 including a lip seal ring or the seal ring according to DE 35 09 840 A1).

The object of the invention is to propose alternatives to the prior art for gas pressure regulators or in general for devices through which gas or fluid flows. Depending on the teaching according to the invention, the alternatives relate to safe interruption of the gas flow in the case of external forces or accelerations, alternatively or supplementarily to the regulation of the fluid or gas pressure and/or to the sealing of passages, for example in gas-conducting devices.

According to a first teaching, the object is solved by a safety device for interrupting a gas flow within a gas-conducting device, comprising an inertia mechanism and a reaction mechanism, wherein an inertia body of the inertia mechanism moves from a resting position in the case of an acceleration above a specifiable acceleration threshold value acting on the inertia body, and the inertia mechanism activates the reaction mechanism due to the movement of the inertia body, wherein the activated reaction mechanism interrupts the gas flow within the gas-conducting device, and wherein the safety device is free of gas flowing through it.

The safety device is designed to interrupt a gas flow within a gas-conducting device if a force or an acceleration occurs above the predefined threshold value. The definition of the threshold is required so that any movement or shock cannot activate the safety device. In this process, the safety device is usually in a normal state in which the gas flow is not interrupted. Due to a correspondingly high acceleration, the safety device is put into the activated state. The acceleration particularly acts on an inertia body, which leaves a resting position. This movement of the inertia body activates a reaction mechanism, which, in turn, causes the interruption of the gas flow.

The essential feature in this process is that no gas flows through the safety device. Contrary to the prior art, the gas flow does not pass through the safety device. Therefore, the safety device is correspondingly connected to the gas-conducting device, so that the reaction mechanism can have an effect on the gas flow within the gas-conducting device. Accordingly, the embodiments and explanations also relate to an arrangement consisting of a gas-conducting device and a safety device. In one embodiment, the gas-conducting device in an arrangement substantially consists of a metal and the safety device substantially of a plastic.

The gas-conducting device is, for example, a gas pressure regulator.

In one embodiment, it is provided that the inertia mechanism has a pit in a housing for accommodating the inertia body, that the inertia body is in the resting position in the pit (an alternative designation would, for example, be cavity or recess) in a normal state, and that the inertia mechanism has a transfer pin which, in the normal state, holds the inertia body in the resting position and which, in an activated state, prevents the inertia body from returning to the resting position. In this embodiment, the inertia body rests in a pit in the normal state, and a transfer pin holds the inertia body in place. The respective dimensions can preferably be used for defining the threshold value of the acceleration from which the inertia body leaves the resting position, and the safety device enters the activated state. The inertia body is, for example, prevented from returning to the resting position in that the transfer pin, in the activated state, extends into the area above the pit so deeply that the resting position is blocked. This, for example, can be realised in that the distance between the pit in the area of the resting position and the tip of the transfer pin is smaller than the outer diameter of the inertia body.

One embodiment is that the inertia mechanism has a spring allocated to the transfer pin, and that the spring, in a state of tension, exerts a force on the transfer pin, which is directed away from the pit. This embodiment, for example, serves to return the inertia mechanism from the activated state to the normal state. For this purpose, however, in particular, with reference to the preceding embodiment, the transfer pin must be sufficiently away from the pit, so that the inertia body will reach the resting position again. The allocated spring, which, for example, is tensioned while leaving the normal state, provides for the movement of the transfer pin.

In one embodiment, it is provided that the safety device has a sliding punch, and that the sliding punch and the transfer pin are mechanically coupled to one another in such a manner that the sliding punch prevents, in the normal state, a movement of the transfer pin away from the pit. This embodiment describes a fixation of the transfer pin for the normal state. Since, depending on the embodiment, the transfer pin rests on the inertia body and holds it in place, it is necessary that the transfer pin itself remains in its position. This happens here by means of the sliding punch. Therefore, the threshold value of the acceleration can be defined by way of the type and arrangement of the sliding punch in one embodiment.

According to another embodiment, it is provided that the sliding punch is designed and supported for movability, and that the sliding punch moves the transfer pin in the direction of the pit when moving from the normal state to the activated state. The sliding punch in this embodiment is movable and causes that the transfer pin, in the activated state, is located closer in the direction of the pit and thus prevents the inertia body from returning to the resting position. Therefore, such an independent return of the inertia body is to be prevented since otherwise the gas flow would not be reliably interrupted. In one of the following embodiments, the transfer pin is, in particular, in the activated state, held in position by the sliding punch.

Another embodiment includes that the movement of the sliding punch is an overlapping of, on one hand, an axial movement in the direction of a movement direction of the transfer pin and, on the other hand, of an axial movement in a direction vertical to the movement direction of the transfer pin.

An alternative or supplementary embodiment is that the movement of the sliding punch is an overlapping of an axial movement and of a rotatory movement.

The two preceding embodiments provide that the movement of the sliding punch is the overlapping of a plurality of different movement components in each case. This allows that not only the transfer pin, but also other components of the safety device are moved (cf. the internal component in the following text). The movement in question is at least the movement of the sliding punch from the normal state to the activated state.

One embodiment includes that the pit, the inertia body, the transfer pin and the sliding punch serve to define the acceleration threshold value. Due to the selection of the dimensions and their alignment, the threshold value of the acceleration is predefined from which the transition to the activated state takes place.

According to one embodiment, it is provided that the reaction mechanism has an internal component and an external component, that the internal component is arranged at least partly within the external component, that the internal component is arranged and designed for movability relative to the external component, that a sliding punch of the safety device follows a movement of the internal component, and that the internal component is in a cause-effect relationship with the transfer pin via the sliding punch, so that at least a movement of the internal component has an effect on the transfer pin. In this embodiment, the reaction mechanism by means of which the gas flow is interrupted when the inertia body leaves its resting position is described in more detail.

In one embodiment, the external component serves to hold the reaction mechanism in place, for example, at or in the vicinity of the gas-conducting device. Furthermore, the external component supports or holds the internal component and allows its guidance during the movements of the internal component.

One embodiment includes that the internal component has a substantially cylindrical shape.

According to one embodiment, it is provided that the internal component and the sliding punch are integrally designed.

One embodiment includes that the internal component makes a movement at a transition from the normal state to the activated state which is an overlapping of an axial movement along a longitudinal axis of the internal component and of a rotatory movement around the longitudinal axis. In one embodiment, the axial movement serves to interrupt the gas flow. Furthermore, the interaction between the reaction mechanism and the inertia mechanism is caused by the rotatory movement (or at least by the movement component vertical to the axial movement).

In order that the internal component moves, while the activated state sets in, and thus can interrupt the gas flow, the following embodiment is provided. This embodiment includes that, in the normal state, a spring allocated to the internal component exerts a force on the internal component, and that the inertia body, the transfer pin and the sliding punch prevent, in the normal state, the spring allocated to the internal component from moving the internal component. In this embodiment, the transfer pin, amongst others, prevents, in the normal state, the aforementioned spring from transferring the spring force to the internal component. Thus, if, in one embodiment, the transfer pin, in the activated state, leaves its position (in the direction of the pit), the blockage of the spring is released, and the spring force is transferred to the internal component, which thus moves as well. In one embodiment, the spring is tensioned by a readjusting mechanism.

One embodiment provides that the spring allocated to the internal component is a coil spring. Such a coil spring, for example, has the advantage that the internal component connected to it can make an axial and a rotatory movement.

One embodiment includes that the spring allocated to the internal component causes an axial movement and a rotatory movement of the internal component relative to the external component.

One embodiment provides that the internal component and the external component comprise ribs and corresponding gorges allowing an axial movement of the internal component relative to the external component. The combination of ribs and gorges allows a kind of guided movement of the internal component relative to the external component. In an embodiment, the gorges have a greater radial extension than the elements separating the gorges from each other.

One embodiment includes that the internal component comprises the ribs and the external component comprises the corresponding gorges. In an alternative embodiment, the external component comprises the ribs and the internal component comprises the corresponding gorges. In a still different embodiment, the internal component and the external component, both, comprise ribs as well as gorges.

One embodiment provides that the ribs have angled planes on their front ends for transforming an axial force acting on the internal component into an axial and angular force. The ribs end with an angled plane that slides—during the passage from the normal state to the activated state—along a corresponding counterpart causing by this the angular movement.

One embodiment includes that an angle of the angled planes serves to define the acceleration threshold value. In this embodiment, the geometry of the angled planes is used to define—in an embodiment with other constrictions, e.g. with the spring acting on the internal component—the acceleration threshold value.

One embodiment provides that the safety device has a readjusting mechanism, and that an operator can reset the reaction mechanism from the activated state to the normal state via the readjusting mechanism. The readjusting mechanism causes the safety device to reset to the normal state and can again monitor the acting acceleration and interrupt the gas flow, where required. Furthermore, due to the reset, the gas flow will not be interrupted by the safety device anymore, so that the gas can flow again. The readjusting mechanism as a whole contributes to the fact that the safety device can shift reversibly between the states (normal state and activated state).

One embodiment includes that the readjusting mechanism is coupled to a spring in such a manner that, during a reset, a force dependent on the spring must be overcome. The reset must in this embodiment be done deliberately by a user. This increases the safety since the gas flow cannot be released unintentionally.

One embodiment provides that the readjusting mechanism is an axial extension of the internal component along a longitudinal axis of the internal component. In this embodiment, the readjusting mechanism is thus moved together with the internal component during each change between the states. In one embodiment, the readjusting mechanism and the internal component are, in particular, of a single-piece design. In one variant, the readjusting mechanism, for example, is provided by a cylindrical pin. In one embodiment associated therewith, the cylindrical pin of the readjusting mechanism abuts a front end of the internal component. In one embodiment, the internal component has a cylindrical portion, and the readjusting mechanism has a cylindrical pin, wherein the pin abuts a front end of the cylindrical portion of the internal component. In this process, the cylindrical portion has a greater diameter than the cylindrical pin.

One embodiment includes that the user moves the readjusting mechanism along a longitudinal axis of the internal component for resetting in an axial direction.

One embodiment provides that the user, during a reset, tensions a spring allocated to the internal component. In one embodiment, the user supplies that energy to the spring again, which, for example, is used to move the internal component, while the activated state sets in, and that the gas flow is thus interrupted as well.

One embodiment includes that the inertia body is a ball.

One embodiment provides that the gas-conducting device is a gas pressure regulator. In an alternative embodiment, the gas-conducting device is a valve.

One embodiment includes that the safety device and the gas-conducting device are connected to one another and form a joint arrangement.

The object is solved by a second teaching according to the invention, which relates to a gas-conducting device. The gas-conducting device can be allocated to the safety device of the aforementioned first teaching or, in particular, form an arrangement consisting of a gas-conducting device and a safety device. Alternatively, the gas-conducting device is independent of the aforementioned safety device. Thus, the gas-conducting device is, for example, connected to another safety device or is free of a safety device.

The following explanations thus relate to the gas-conducting device of the second teaching of the invention and, alternatively, to additional embodiments of the safety device or an arrangement consisting of a gas-conducting device and a safety device according to any one of the embodiments disclosed herein or according to an alternative embodiment. The device of the second teaching offers in particular an alternative to the prior art with regard to regulating the gas pressure to a predefined target value.

The gas-conducting device has a gas inlet, a gas outlet and a rotatably supported lever arm for pressure regulation. The lever arm is mechanically coupled to a movement pin and a sealing punch at its end. The movement pin and the sealing punch are arranged within a housing in such a manner and connected to the gas inlet in such a manner that a gas intruding via the gas inlet pushes against the movement pin and the sealing punch with balanced forces.

The lever arm has, in one embodiment, two end portions on which the movement pin and the sealing punch, respectively, act. A bearing is provided between the two end regions, so that the lever arm can be rotated or swiveled around this rotation axis. Due to the bearing around the bearing axis, two partial arms of different lengths or, alternatively designated, two different sections between the bearing location and the end regions of the lever arm emerge in one embodiment.

The gas, the pressure of which is to be regulated to a target value, is applied on the two end regions of a lever arm by means of a moving pin on one side and of a sealing punch on the other side. Due to the embodiment and arrangement of the elements in question or, for example, also due to the cross-section of the passages through which the gas is routed, it can be set that the forces, as a result of the gas pressure applied to the inlet side, are independent thereof balanced on both end regions of the lever arm. For example, the gas pressure changes dependent on the type of volume through which the gas flows, or at which temperature the gas arrives at the inlet. Therefore, if the gas is routed through differently sized passages to the movement pin or the sealing punch, and if the gas thus acts on different surfaces in each case, then different forces act on the lever arm in each case as well.

Thus, some kind of rocker is given by the lever arm on both sides of which the gas pressure acts and this to an extent that is caused by the embodiment of the components involved (here movement pin and sealing punch) and by the dimensions of the housing sections or housing passages enclosing the components involved.

According to one embodiment, it is provided that the reaction mechanism of the safety device is mechanically coupled to a holding punch of the gas-conducting device, and that the holding punch is mechanically coupled to a membrane, so that the holding punch has effects on the pressure regulation by the membrane. In this embodiment, the gas-conducting device has a membrane. The membrane, its characteristics, its position or the pressure applied to the side opposite to the gas-conducting side determine the pressure regulation. In this embodiment, a holding punch is provided which is mechanically coupled to a membrane and which is, in particular, also coupled to the reaction mechanism. Thus, the reaction mechanism of the safety device can indirectly act on the membrane via the reaction mechanism and thus, for example, interrupt the gas flow as well. Thus, there is generally an indirect connection or coupling between the reaction mechanism and the membrane.

One embodiment provides that the lever arm is mechanically coupled to a holding punch of the gas-conducting device, and that the holding punch is mechanically coupled to a membrane, so that the holding punch has effects on the pressure regulation by the membrane. In one embodiment, coupling is ensured by the fact that the lever arm and the holding punch contact one another directly or indirectly in at least one area or in the case of at least one relative adjustment. In this process, the membrane, in particular, serves for pressure regulation.

According to one embodiment, it is provided that a membrane partly covers an intermediate chamber, that the gas inlet is connected to the intermediate chamber via a duct, and that the sealing punch is arranged between the duct and the intermediate chamber in such a manner that a gas pressure of a gas applied to the gas inlet has an effect on the sealing punch. The actual pressure regulation occurs via an intermediate chamber, which is unilaterally limited by a membrane. The target pressure for the gas can be predefined by the adjustment of the membrane or by the spring force acting on the side that faces away from the intermediate chamber. Here the gas enters the intermediate chamber via a passage in such a manner that the pressure also acts on the sealing punch, which is mechanically coupled to the lever arm.

According to one embodiment, it is provided that the sealing punch, in one position, seals the duct. This position of the sealing punch is caused, in one embodiment, by a safety device. In one embodiment, the safety mechanism acts on the lever arm. The lever arm then places the sealing punch onto the passage in a sealing manner. In one embodiment, the safety device acts on a holding punch, which unilaterally pushes the lever arm in a direction, so that the other side of the lever arm acts together with the sealing punch and seals the passage.

In one embodiment, the reaction mechanism has an effect on the lever arm, so that, in the activated state, a passage between the gas inlet and the intermediate chamber is sealed. In one embodiment, the aforementioned passage is the sole connection between the gas inlet and the intermediate chamber via which the pressure regulation takes place.

One embodiment includes that the movement pin is arranged gas-tight within a housing of the gas pressure regulator. Thus, the gas only pushes against the movement pin; however, a gas flow does not take place through the area around the movement pin. Furthermore, the gas preferably enters the intermediate chamber via the passage only, via which the gas can act on the sealing punch as well.

One embodiment is characterised in that the gas-conducting device has, within a pressure regulator housing, a movable component and a sealing arrangement enclosing the movable component and sealing against the pressure regulator housing.

One embodiment includes that the reaction mechanism of the safety device is mechanically coupled to a holding punch of the gas pressure regulator, and that the holding punch is mechanically coupled to a lever arm, and that the lever arm can seal a connection between a gas inlet and a gas outlet of the gas pressure regulator via a sealing punch. Thus, the lever arm acts on the sealing punch, so that the connection and in particular the duct in the housing is sealed.

Thus, the pressure regulator, in one embodiment, can be described as follows:

A membrane partly covers an intermediate chamber, which serves for the actual pressure regulation. The gas the pressure of which must be regulated pushes, originating from a gas inlet, on the two front ends of a rotatably supported lever arm. Due to the dimensions of the components involved or gas passages etc., it is realised that the forces on the two front ends are balanced. Thus, no torque is generated on the lever arm. The gas enters the intermediate chamber via a passage in such a manner that the gas exerts a force on one front end of the lever arm as well. The membrane, in turn, is mechanically coupled to the other front end. This mechanical coupling to the front end through which the gas does not pass is also used for the safety device to interrupt the gas flow, by sealing the passage through which the gas enters the intermediate chamber. In one embodiment, the gas pushes on both front ends in substantially the same direction in which also the membrane is movable (accordingly, lifts or lowers itself during the pressure regulation).

The object is solved by a third teaching according to the invention, which relates to a sealing arrangement for a gas-conducting device. The gas-conducting device can, for example, be that of the aforementioned second teaching, which, for example, is allocated to the safety device of the aforementioned first teaching in one embodiment. Alternatively, the sealing arrangement is allocated to a differently designed gas-conducting device.

The following explanations thus relate to the sealing arrangement of the third teaching of the invention and, alternatively, to additional embodiments of the safety device or an arrangement consisting of a gas-conducting device and a safety device and, in addition, alternatively to supplementary embodiments of the gas-conducting device of the second teaching. The sealing arrangement of the third teaching offers, in particular, a reliable sealing of a passage of an arbitrarily designed gas-conducting device. The gas-conducting device is, for example, a gas pressure regulator.

The object is solved by a sealing arrangement according to a third teaching. The sealing arrangement is designed in such a manner that the sealing arrangement has a first sealing element and a second sealing element, wherein the first sealing element is arranged downstream of a gas inlet of a housing in the gas flow direction, that the second sealing element is arranged downstream of the first sealing element in the gas flow direction, and that the second sealing element is designed in such a manner that in the case that a gas overcomes the first sealing element, the gas will reinforce a sealing function of the second sealing element. The gas can, for example, overcome the first sealing stage in the case of a defect or generally of a leakage and thus reach up to the second sealing element. In this case, the gas ensures that the sealing function of the second sealing element is further enhanced (or reinforced).

In one embodiment, three sealing areas are generated by the sealing arrangement. Sealing takes place via each abutment area, for example, between a component movable within a housing and the housing or, for example, a passage of the housing. The number of abutment areas refers, for example, to a side or a section of the movable component. In one embodiment, the first sealing element and the second sealing element each enclose the movable component in a rotationally symmetrical manner, so that the abutment areas in another embodiment fully each enclose the movable component at the same height. In one embodiment the movable component is, in particular, a rotation-symmetrical component. This also means that the sealing elements are designed in a rotationally symmetrical manner and therefore abut the movable component in a rotationally symmetrical manner and, accordingly, cause abutment areas circumferential around the component.

One embodiment of the sealing arrangement is that the first sealing element is arranged within a tighter supporting surface of the pressure regulator housing, and that the second sealing element is arranged within a wider supporting surface having a greater inner diameter than the tighter supporting surface. In one embodiment, the second sealing element has a greater expansion than the first sealing element.

One embodiment provides that the first sealing element is an X-ring. Thus, the first sealing element has a ring shape, wherein the ring has a rectangular and preferably square cross-section. The sides of the rectangle or of the square are preferably inwardly rounded.

One embodiment includes that the second sealing element has a sealing lip, which is designed and arranged in such a manner that the sealing lip abuts the movable component at a free end and forms a sharp angle relative to a longitudinal axis of the movable component. In this process, the free end of the movable component is preferably directed in opposition to the gas flow direction. In the case of a leaking first sealing element, the gas flow pushes the sealing lip against the movable component. Thus, the second sealing element is designed in such a manner that the sealing function of the second sealing element is even reinforced in the case that the first sealing element is defective.

One embodiment includes that the movable component is a movement pin of the gas-conducting device designed as a gas pressure regulator.

Figure 2:
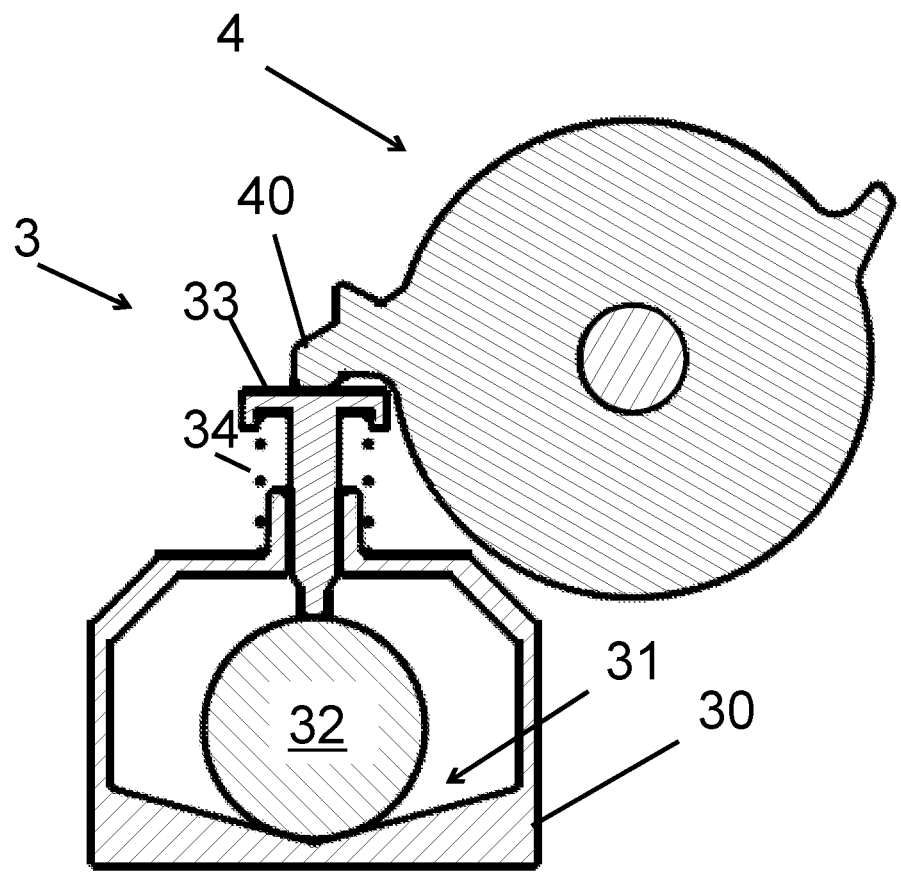
Figure 3:
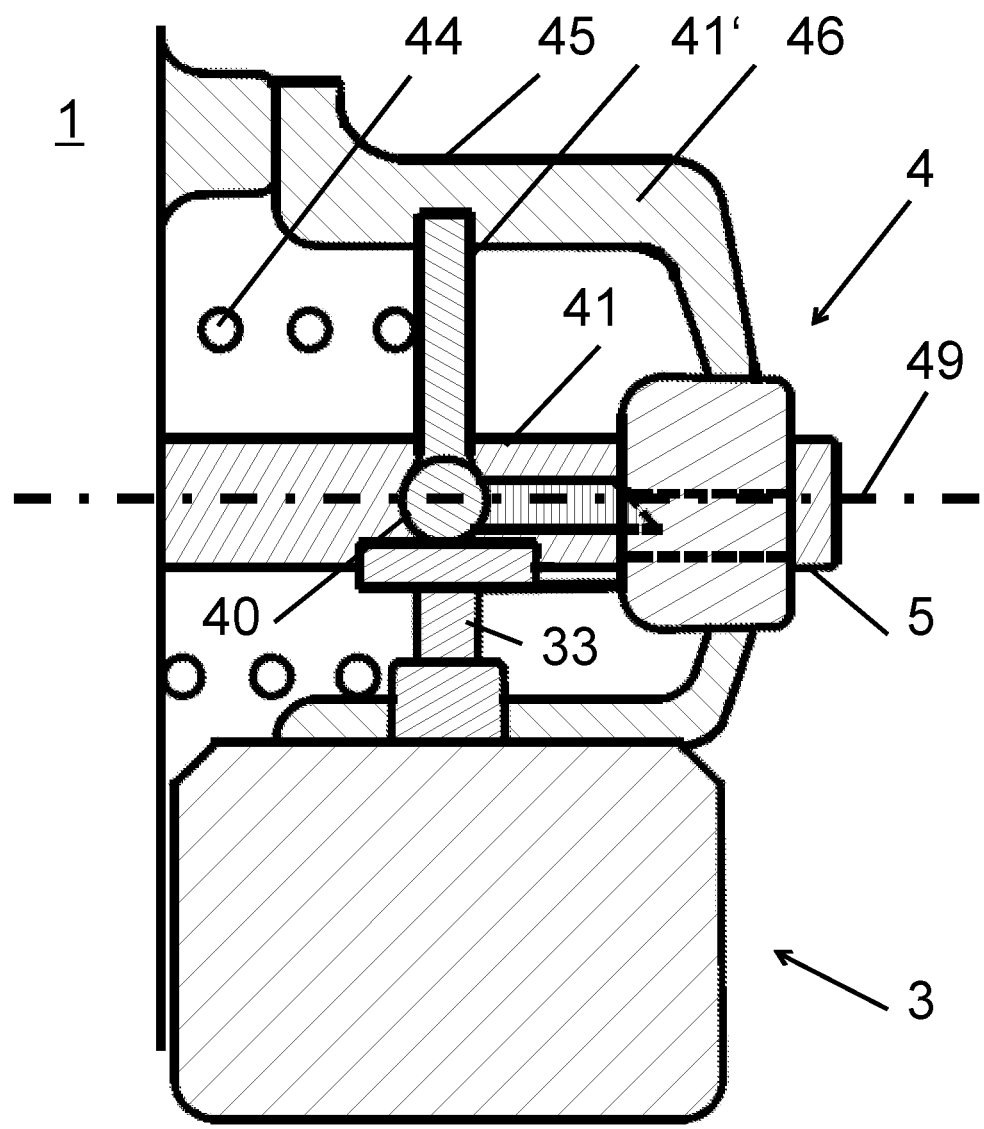
Figure 3:
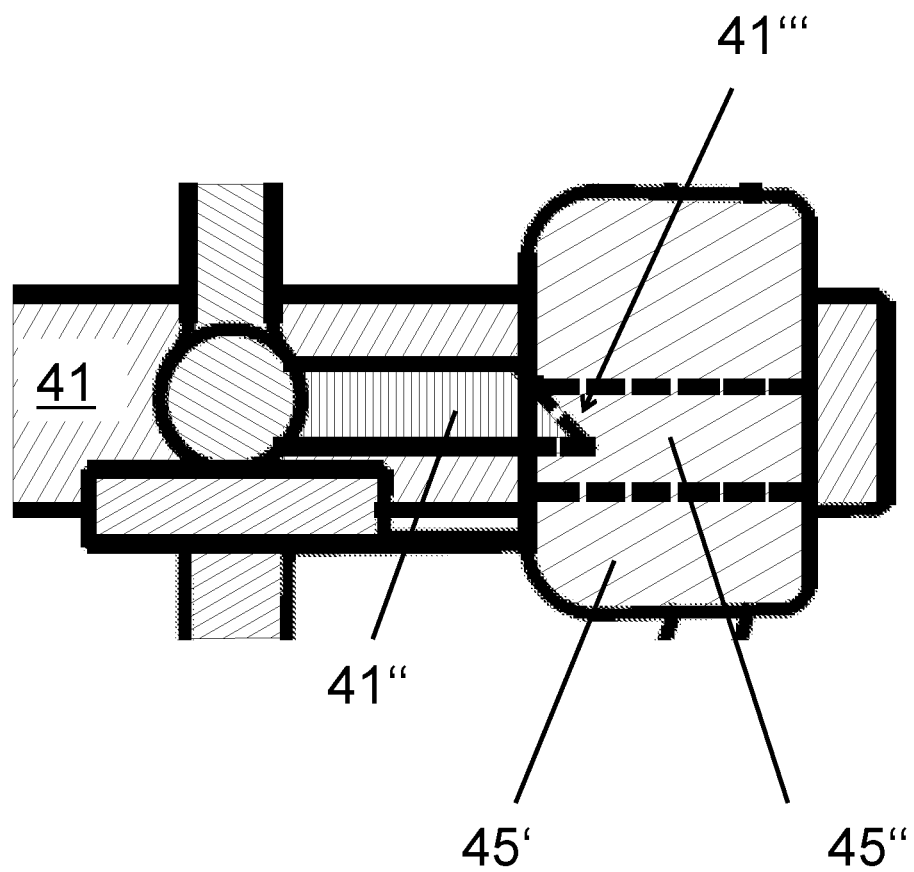
Figure 4:
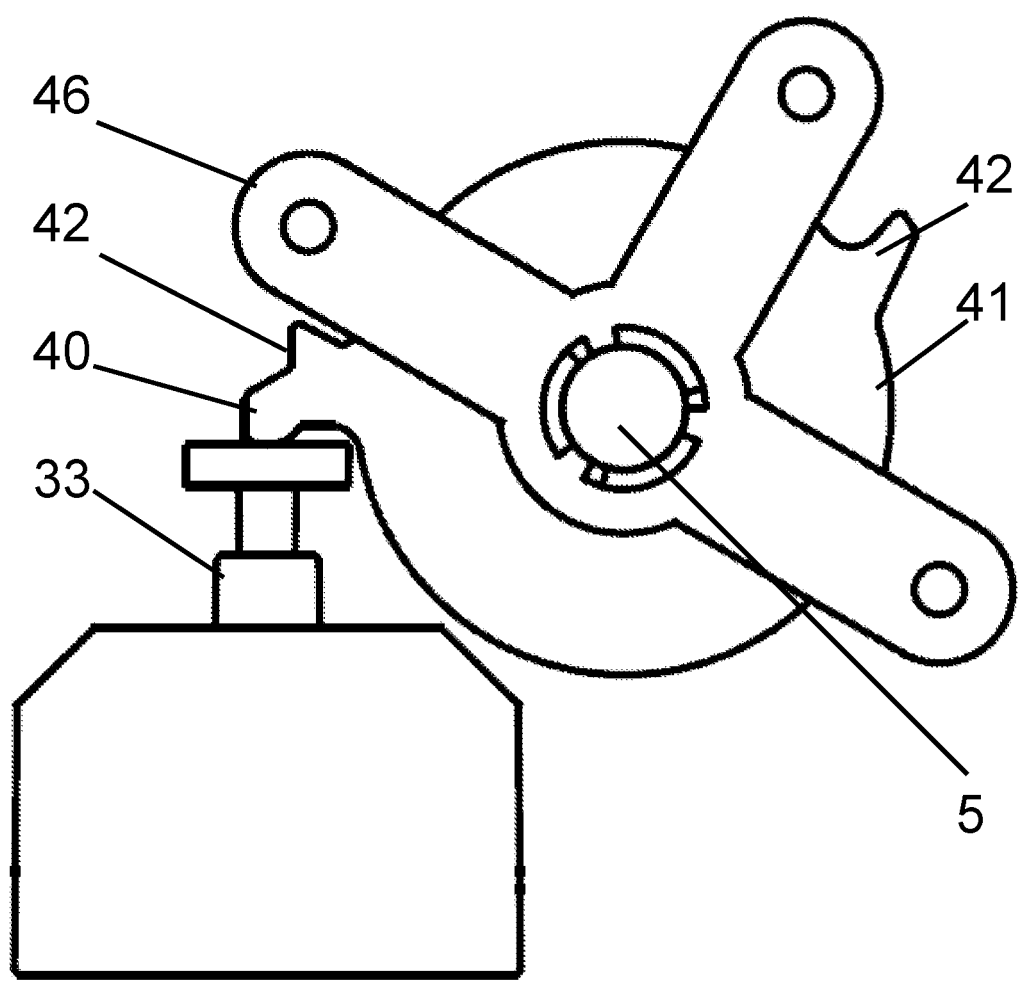
Figure 5:
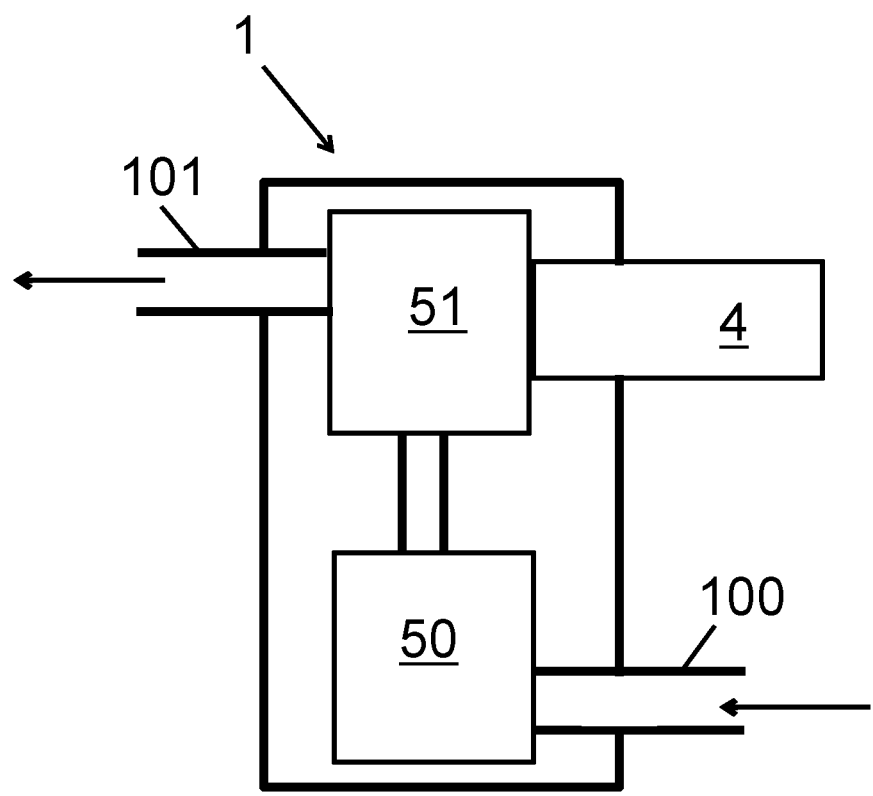
Figure 6:
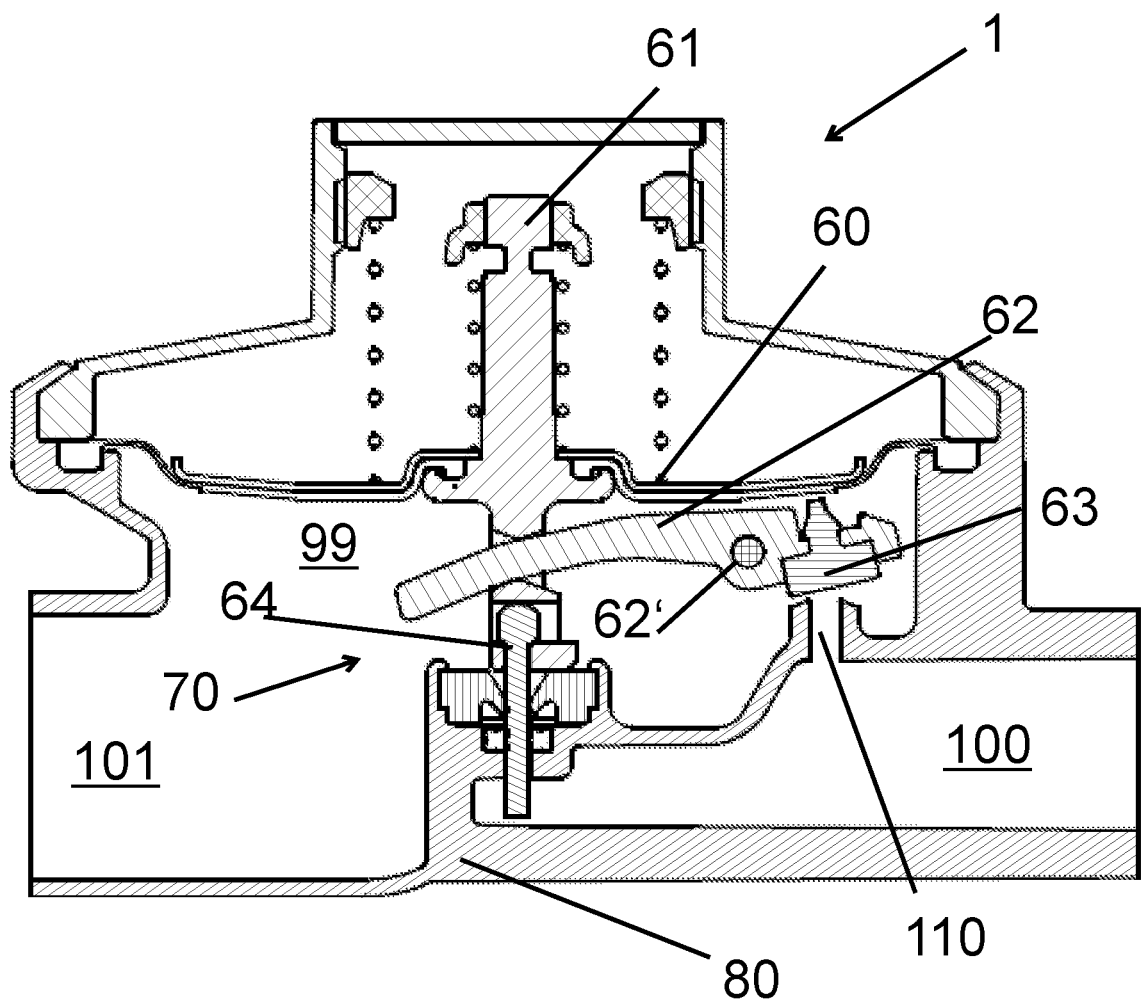
Figure 7:
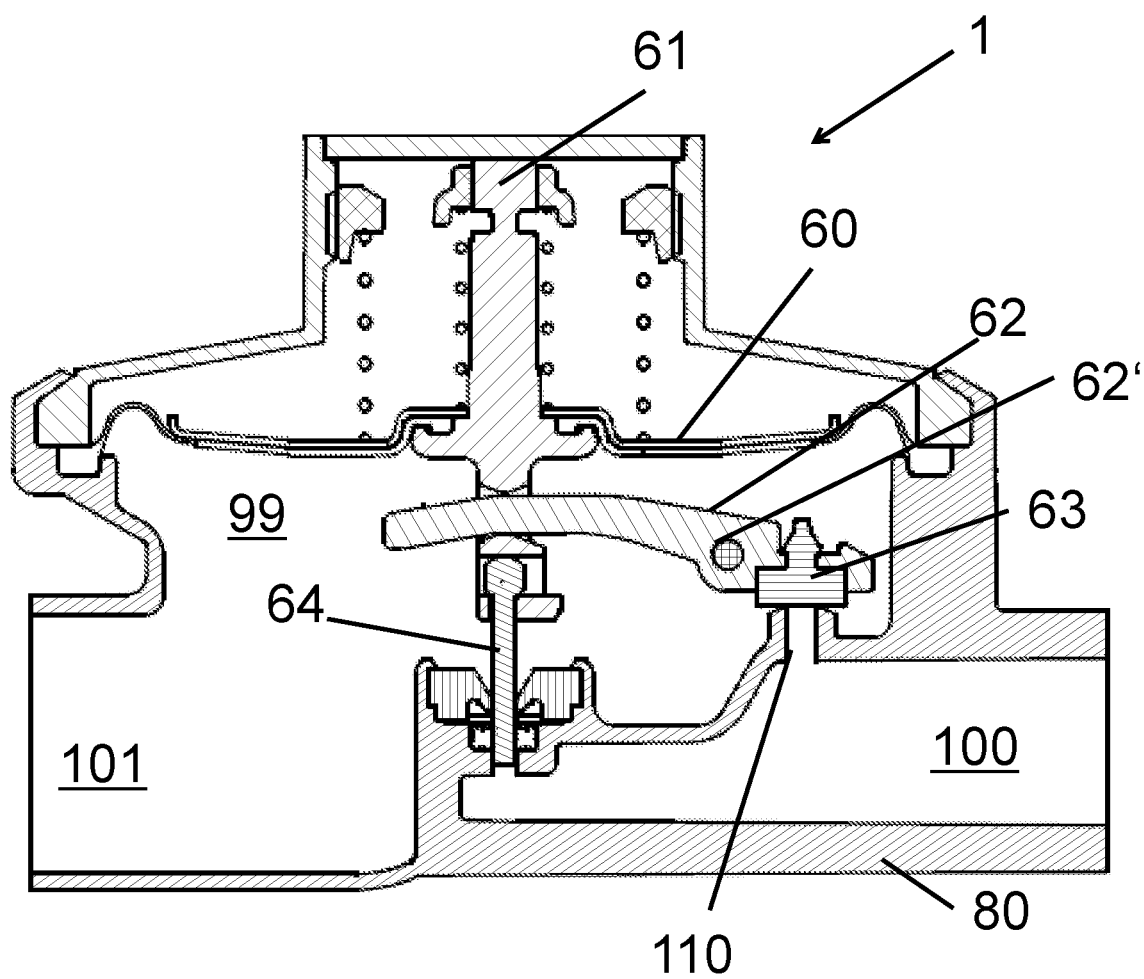
Figure 8:
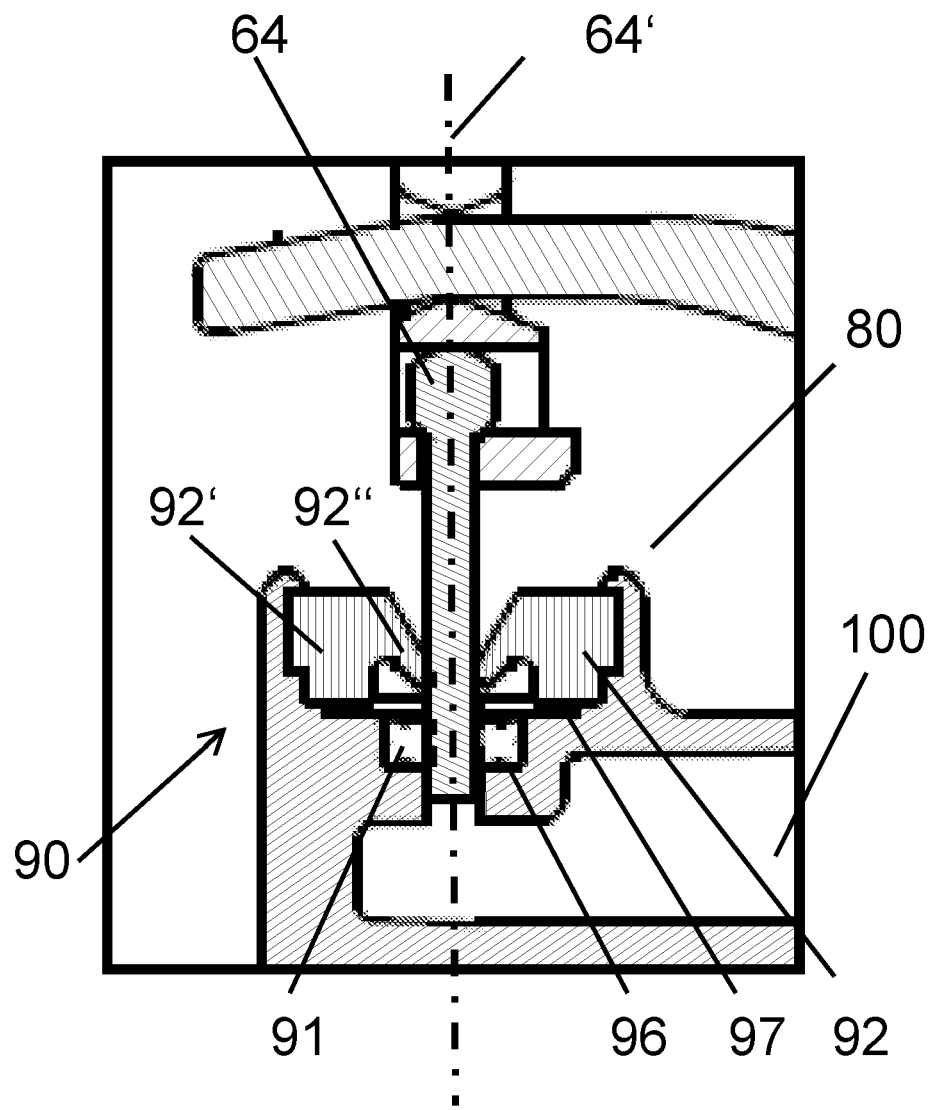

In detail, there is a great variety of possibilities to design and further develop the invention. For this purpose, reference is made, on one hand, to the claims dependent on claim 1, and, on the other hand, to the following description of exemplary embodiments in connection with the drawings, in which:

FIG. 1 shows a schematic diagram of an arrangement comprising a gas pressure regulator as the gas-conducting device and a safety device, FIG. 2 shows a schematic diagram of a part of the safety device, FIG. 3 shows a section through an embodiment of an arrangement comprising a gas pressure regulator and a safety device, FIG. 3a shows an enlarged part of FIG. 3, FIG. 4 shows a front view of the embodiment of FIG. 3, FIG. 5 shows a schematic diagram of the set-up of a gas pressure regulator as an example of a gas-conducting device which by way of an example is connected to a safety device, FIG. 6 shows a section through an embodiment of a gas pressure regulator, FIG. 7 shows the section of FIG. 6 in the case that the gas flow has been interrupted, and FIG. 8 shows an enlarged section of the gas pressure regulator of FIG. 6 or of FIG. 7 as an example of the use of the sealing arrangement.

FIG. 1 schematically shows the arrangement consisting of a device 1 through which a gas (indicated by the arrows) flows and of a safety device 2.

Device 1 through which the gas flows is, in the example illustrated here, a gas pressure regulator having a gas inlet 100 and a gas outlet 101. Alternatively, it can be a valve.

The safety device 2 has the purpose to interrupt the gas flow through the device 1 if too high an acceleration, e.g. as a result of an accident, acts on the arrangement and especially on the safety device 2. In the illustrated embodiment, the safety device 2 is mounted on the side of the device 1 through which the gas flows, and, in particular, the gas does not flow through the safety device 2 itself. In the activated state, i.e. in the case of an accident, for example, the safety device 2 acts on the device 1 through which the gas flows and seals it. Thus, the sealing is omitted, which is required in the prior art, since the inertia body in the prior art is located in an area through which the gas flows.

In the embodiment shown, the device 1 through which the gas flows and the safety device 2 consist of different materials, namely, in particular, of a combination of metal and plastic. The use of plastic for the safety device 2 is made possible since the gas does not flow through the safety device 2.

The safety device 2 has an inertia mechanism 3 and a reaction mechanism 4.

The inertia mechanism 3 reacts from a specific threshold value to the accelerations occurring and controls—here via a mechanical connection to a transfer pin 33 to be explained in the following text—the reaction mechanism 4 which, in turn, acts on the device 1—here the gas pressure regulator—through which the gas flows and, in the case of too high an acceleration, interrupts the gas flow.

To enable the gas flow again, a readjusting mechanism 5 is provided which is here connected to the reaction mechanism 4. If the readjusting mechanism 5 is, for example, manually operated by a user, the gas flow through the device 1 is enabled on one hand, and the inertia mechanism 3 is reset on the other hand. Thus, a user can reset the safety device 2 from the activated state to the normal state again via the readjusting mechanism 5.

FIG. 2 shows a section through a schematic diagram of the inertia mechanism 3. It shows the normal state, i.e. acceleration too high has not occurred, and the gas flow within the connected gas pressure regulator is not interrupted.

A housing 30 of the inertia mechanism 3 has a pit 31, in the deepest point of which an inertia body 32 in the form of a ball is located. A transfer pin 33, which has a T-shape here, rests on the ball 32 and thus reversibly holds the position of the ball 32 in place.

Due to the shape of the pit 31, the type of the supporting surface of the transfer pin 33 on the ball 32 and, in turn, the force acting on the transfer pin 33, a threshold value is defined for the acceleration from which the ball 32 leaves its position in the pit 31 as a result of mass inertia. Hence, this is the activated state which indicates that an acceleration above the settable threshold value has occurred. In the activated state, it is ensured that no gas flows through the device (or specifically the gas pressure regulator of FIG. 1).

In order that the ball 32 does not roll back again into the resting position of the normal state, the transfer pin 33 moves, in the activated state, in the direction of the pit 31 and thus blocks the path of the ball 32.

This movement of the transfer pin 33 from the normal state to the activated state and thus to the state interrupting the gas flow is realised in the illustrated embodiments as follows:

For the transition from the normal state to the activated state, a sliding punch 40 rests on the upper front end of the transfer pin 33. The sliding punch belongs to the reaction mechanism 4.

The—non illustrated—state that the ball 32 is no longer located underneath the transfer pin 33 is to be taken into consideration, so that the transfer pin 33 can thus escape downward in the direction of the pit 31.

In this case of the activated state, the sliding punch 40 (due to a spring as explained in the following text) moves (in addition to the axial movement discussed in the following text) from top to bottom so that the transfer pin 33 is—routed through a recess in the housing 30—pushed in the direction of the pit 31.

The spring 34 enclosing the transfer pin 33 is thereby tensioned at the same time. The spring energy stored in the spring 34 is needed in case that the inertia mechanism 3 is to be reset again and that, in this process, the transfer pin 33 is to be moved upward again.

In the activated state, the sliding punch 40 prevents an upward movement of the transfer pin 33, and thus it is ensured that the ball 32 cannot reach the starting or resting position (i.e. generally the position of the normal state which allows the gas flow).

The reaction mechanism 4 comprising the sliding punch 40 (cf. FIG. 1) is explained in connection with figures FIG. 3, FIG. 3a and FIG. 4.

The reaction mechanism 4 has an internal component 41 and an external component 45.

The internal component 41 has substantially the shape of a cylinder on which a circular disc 41' is mounted. The disc 41' is partly flattened, so that it does not strike against the inertia mechanism 3. The cylinder of the internal component 41 is, on one hand, arranged for axial movability along a longitudinal axis 49 of the cylinder and is connected, on the other hand, to the readjusting mechanism 5. Two mandrels 42 and the sliding punch 40 are located on the aforementioned disc 41'.

As can be seen in FIG. 3a, the internal component 41 is provided with ribs 41"—in the shown embodiment—being aligned along the longitudinal axis 49. The ribs 41" end—in a direction away from the gas pressure regulator 1 (cf. FIG. 3)—in a front end having an angled plane 41'''. The ribs 41" are followed along the internal component 41 by a smooth and especially rib-free region that becomes the readjusting mechanism 5.

The readjusting mechanism 5 is substantially an axial extension of the cylinder via which a user can apply a force and thus can move the internal component 41 axially in the direction of the resting position and, in this process, in the direction of the gas pressure regulator 1.

Furthermore, the internal component 41 is rotatably supported around the longitudinal axis 49, so that it can rotate anticlockwise to the external component 45.

The external component 45, which encloses the internal component 41 radially and partially also axially, is here attached to the gas pressure regulator 1.

The external component 45 has three webs 46, which are each angled and meet in a common front area 45' through which the internal component 41 and the pin-shaped readjusting mechanism 5 are routed. Thus, the webs 46 hold and guide the readjusting mechanism 5 and, at the same time, also the internal component 41.

Furthermore, the webs 46 serve as locating surfaces for two mandrels 42 of the internal component 41, so that the rotatory movements of the internal component 41 are each limited in clockwise and anti-clockwise direction.

The common front area 45' of the external component 45 has gorges 45" on the internal surface of its central opening. The gorges 45" correspond to the ribs 41' of the internal component 41 and allow the axial movement of the internal component 41 relative to the external component 45 as the ribs 41' are pushed into the gorges 45" by spring 44. As will be explained in the following, the axial movement is enabled by the rotation of the internal component 41 relative to the external component 45. In an—not shown—embodiment, the gorges 45" have a larger radial extension than the sides limiting them. In this—not shown—embodiment, the gorges 45" are separated by just small rib-like partitions.

The clockwise movement (viewed as in FIG. 4) occurs during the reset of the safety device 2. Due to the mandrel 42 striking against the web 46, the axial path of the transfer pin 33 is limited.

The anti-clockwise movement takes place when the transfer pin 33 is no longer held by the ball of the inertia mechanism 3, and the sliding punch 40 pushes down the transfer pin 33 when the activated state is given.

A spring 44 (here a coil spring) acts on the internal component 41, which, in the normal state of the safety device, is tensioned. The spring 44 is designed in such a manner that it, when relaxed, causes a rotatory movement of the internal component 41 connected to it.

The rotation of the internal component 41 is also the result of the interaction between the angled planes 41''' of the ribs 41" and the opposite front ends of the sides limiting the gorges 45" of the external component 45. The angled planes 41''' glide along the front ends of the sides of the gorges 45" during the axial movement and cause, accordingly, the rotation of the internal component 41. Thus, the angled planes 41" transfer the axial force acting by the spring 44 on the internal component 41 into a superposition of an axial and an angular force.

If the acceleration acts on the inertia mechanism 3 and the transfer pin 33 can move as a result thereof, then the internal component 41 is rotated due to the spring force of the spring 44 and moved axially outward along the longitudinal axis 49. In this process, the sliding punch 40 slides across the upper front surface of the transfer pin 33 and pushes it down into the housing of the inertia mechanism 3.

On one hand, rotation of the internal component 41 is restricted in that a mandrel 42 strikes against a web 46 of the external component 45. On the other hand, the internal component 41 strikes axially against the front end of the external component 45. Thus, the internal component 41 cannot move any further, and due to the spring 44, no further rotation can occur. The internal component 41 is routed through the front end of the external component 45 until it strikes against it. At the same time, the readjusting mechanism 5, which in the embodiment shown, is a cylindrical pin having a smaller external diameter than the cylindrical portion of the internal component 41, is moved axially.

In this activated state, which occurs as a result of the acting acceleration, the spring 44 also prevents that the internal component 41 is moved axially unintentionally and thus can be reset. This axial movement must occur with sufficient force, which depends on the spring constant of the spring 44. Thus, such readjustment only occurs through the readjusting mechanism 5.

To return it to the normal state, a user exerts a mechanical force on the readjustment mechanism 5, and the internal component 41 is returned axially along the longitudinal axis 49. Thus, the spring 44 of the internal component 41 is tensioned. At the same time, the spring (see FIG. 2) of the transfer pin 33 acts on the transfer pin 33 and moves it upward, whereby also the internal component 41 is rotated relative to the external component 45 due to the interaction with the sliding punch 40.

Additionally to the axial movement of the internal component 41, also a rotation of the internal component 41 relative to the external component 45 might be necessary for returning to the normal state. In the normal position, the angled planes 41" are located at least partially in axial direction in front of and are in touch with the sides limiting the gorges 45". Thus, the angle of the angled planes 41" defines the force acting on the ball 32 (see FIG. 2) during the normal state and, accordingly, the minimal acceleration needed to push the ball 32 out of the pit 31.

The following figures refer to the interior of the device 1 through which the gas flows. Two principally different gas pressure regulators are illustrated and shown, which can also be used in connection with other safety devices or independent of any such safety devices.

FIG. 5 schematically shows the set-up of a two-stage gas pressure regulator 1, in which the aforementioned safety device can, for example, be used.

The gas pressure regulator 1 has a gas inlet 100 via which gas from a gas source not shown, e.g. a gas cylinder, is supplied to the gas pressure regulator 1 at an arbitrary gas pressure, and a gas outlet 101 via which the gas exits the gas pressure regulator 1 at a specifiable target pressure.

The spatial arrangement of the gas inlet 100 and the gas outlet 101 is here different to that of FIG. 1, which makes it clear that the relative orientation is arbitrarily selectable.

Here, too, the gas pressure regulator 1 is connected to a control component (here the reaction mechanism 4 of the embodiment of FIGS. 1 to 4) of a safety device. In an alternative embodiment, the gas pressure regulator 1 can be used without such a safety device. This, for example, in the case that it is a permanently installed gas system, which need not be secured against earthquakes, for example.

Originating from the gas inlet 100, the gas first flows through a pressure reduction stage 50 and from there through a pressure control stage 51. After the pressure control stage 51, the gas exits the gas pressure regulator 1 through the gas outlet 101.

The representation and separation of the individual stages is here to be understood purely functional since individual components can indeed be used by both stages, or since there can be a smooth transition between the two stages.

The safety device (here represented by the reaction mechanism 4) is interrupted in the embodiment shown via the intervention on the pressure control stage 51 (cf. also the following figures). Alternatively, the interruption can take place in the pressure reduction stage 50.

The pressure reduction stage 50 reduces the gas pressure applied, which can have a large range, to a well-defined smaller pressure range. This has the advantage that the pressure control stage 51, which thus assumes the actual function of pressure regulation, must only regulate down to a smaller pressure range and thus can react and regulate the pressure more precisely.

FIG. 6 shows a section through the device 1 through which the gas flows, which is a pressure regulator (or alternative designation: gas pressure regulator). The pressure regulator is designed in such a manner that pressure is reduced and pressure is regulated by one stage. Accordingly, this is an alternative to the pressure regulator of FIG. 5.

In the section of FIG. 6, the gas inlet 100 and the gas outlet 101 can be recognised, between which the pressure regulation takes place via an intermediate chamber 99.

The gas pressure regulator 1 is, in the variant shown, connected to the safety device of FIGS. 1 to 4, which is not illustrated here. In an alternative variant not shown, the gas pressure regulator 1 is connected to a differently designed safety device or to another device, which determines or interrupts or allows the gas to flow through the gas pressure regulator 1. In addition, the pressure regulation mechanism described in the following text and also the components used therefore, in particular, e.g. the sealing device, are independent of the connection with an aforementioned safety device.

Between the gas inlet 100 and the gas outlet 101, a membrane 60 is located, which, as in the prior art, partly encloses an intermediate chamber 99 and thereby enables the pressure regulation. Furthermore, a rocker arrangement 70 is provided for the pressure regulation, the function and components of which are described in the following text.

The membrane 60 is coupled to an axially movable holding punch 61. If the holding punch 61 moves, the membrane 60 is also moved, and thus the regulation of the gas pressure also changes. Thus, the position of the holding punch 61 has an effect on the pressure regulation. The holding punch 61 is, in particular, moved by the safety device when the transition from the normal state to the activated state takes place.

The holding punch 61 is here additionally enclosed by an internal spring arrangement, which extends between the membrane 60 and an upper support in the housing 80. Another external spring arrangement encloses the internal spring arrangement coaxially and rests on the membrane 60. Thus, the external spring arrangement also defines the pressure regulation by the membrane 60. The holding punch 61 moves here, in particular, axially and thus in the direction of a normal of the membrane 60. In addition, the holding punch 61 is arranged centrally to the membrane 60 and penetrates the central point of the membrane 60 in the embodiment shown. Insofar as the holding punch 61 regulates the pressure regulation, the holding punch 61 can additionally contribute to the fact that no gas at all passes the space unilaterally confined by the membrane 60.

Seen from the side of the gas inlet 100, a front end of the holding punch 61 passing through the membrane 60 is in mechanical contact to an end region of a lever arm 62. Conversely, the lever arm 62 can thereby act on the holding punch 61.

The lever arm 62 is rotatably or pivotably supported around a rotational axis 62'. This creates a longer partial arm and a shorter partial arm. Thus, the lever arm 62 constitutes some kind of rocker—here with different arm lengths. A sealing punch 63 is coupled to the shorter partial arm. This occurs in the illustrated embodiment in that the sealing punch 63 is partly passed through the shorter partial arm.

Underneath the end region of the lever arm 62, which forms the longer partial arm and is in contact with the holding punch 61, there is a front end—here spherically thickened—of a movement pin 64. In this process, the movement pin 64 can exert a mechanical force on the longer partial arm of the lever arm 62.

Accordingly, the two end regions of the lever arm 62 are operatively connected to a sealing punch 63 or a movement pin 64. Therefore, the forces acting on the sealing punch 63 and the movement pin 64 also act on the lever arm 62 and therefore indirectly on the membrane 60 and the gas pressure.

The movement pin 64 extends here into the gas inlet 100, so that the gas acts accordingly on the lower front end of the movement pin 64.

Furthermore, the gas inlet 100 is directed to a duct 110, so that the gas acts on the sealing punch 63 via the duct 110.

In this process, the gas can only flow into the intermediate chamber 99 via the duct 110. A gas passage throughout the movement pin 64 is sealed by the sealing arrangement (a realised example is described in the following text).

Due to the dimensions of the sealing punch 63 and of the movement pin 64 and of the associated duct 110 within the housing 80 of the gas pressure regulator 1, it can be set how the gas will in each case act on the two partial arms of the lever arm 62. This is, for example, obvious when the gas behind a duct flows through a wider channel than behind the other duct. On the whole, a desired pressure reduction can be set via the dimensions and the adjustment of the components involved. For example, the diameter of the duct 110 determines the force with which the gas pushes on the sealing punch 63 and thus on the shorter partial arm of the lever arm 62. In the embodiment shown, the dimensions are selected in such a manner that the forces with which the gas acts on the two partial arms of the lever arm 62 are substantially the same. Thus, a compensation of forces of the rotatably supported lever arm 62 is achieved.

The subsequent pressure regulation with the membrane and an intermediate chamber 99 partly covered by it is carried out as is customary in the prior art. Here, in the embodiment shown, the mechanical coupling between the longer partial arm of the lever arm 62 and the membrane 60—here indirectly via the axially movable holding punch 61—has, in particular, an effect.

On the whole, the pressure regulator 1 has a rocker arrangement 70 on which the gas pressure acts on both sides at balanced forces. Furthermore, the rocker arrangement 70 is unilaterally arranged between the gas inlet 100 and an intermediate chamber 99 serving to regulate the gas pressure. After all, the rocker arrangement 70 acts—here indirectly—on the membrane 60, which partly covers the intermediate chamber 99 and thus causes the regulation of the gas pressure.

FIG. 7 shows the case that the gas flow within the gas pressure regulator 1 has been interrupted by a safety device (e.g. the one described before or any other safety device) or by another device.

The reaction mechanism of the above embodiments has, in the activated state, had an effect on the holding punch 61 here and thus lifted the membrane 60. In this process, the gas pushes the movement pin 64 and thus the longer partial arm of the lever arm 62 upward. Thus, the shorter partial arm is moved downward, and the sealing punch 63 seals the duct 110. This way, however, gas can no longer flow from the gas inlet 100 into the intermediate chamber 99 and thus also not to the gas outlet 101. The gas pressure acting on the lower front end of the movement pin 64 even ensures that the sealing punch 63 interrupts the gas flow.

On the whole, the gas from the gas source not shown here does flow into the space of the gas inlet 100, but not any further and especially not to the gas outlet 101.

Accordingly, in the case of an arrangement consisting of a pressure regulator 1 and a safety device 2, only a single duct 110 is sealed in the activated case in order to interrupt the gas flow. This is significantly easier and therefore also safer than in the case of the variants known in the prior art.

When returning the gas regulator 1 to the normal state, the holding punch 61 and thus the longer partial arm of the lever arm 62 is moved downward. The shorter partial arm is thereby lifted, and the gas can flow into the intermediate chamber 99 again.

As stated before with reference to FIGS. 6 and 7, the pressure reduction takes place, amongst other things, in that the movement pin moves within the housing 80 of the gas pressure regulator 1. This passage, which emerges between the movement pin 64 and the pressure regulator housing 80, is to be sealed gas-tight, so that no gas can pass here, but only pushes on the front end facing the gas inlet 100. In this process, it is essential that the sealing occurs against a moving component (here the movement pin 64).

The sealing arrangement 90 described in the following text can be used, in an alternative embodiment, in a differently designed gas-conducting device (and thus not only in the pressure regulator shown), and also without the safety device described.

FIG. 8 shows the sealing of the upper region of the movement pin 64 by means of a sealing arrangement 90 (cf. FIG. 6) within the pressure regulator housing 80, which is here an example of a housing of an arbitrarily designed gas-conducting device. The sealing is formed several times and, in particular, three times.

Two moulded parts are used: a first sealing element 91 and a subsequent second sealing element 92 seen from the gas inlet 100 and the gas flow (cf. FIG. 6).

The first sealing element 91 is located within a tighter supporting surface 96. The tighter supporting surface 96 is shown here open to the top, by expanding to another supporting surface 97 with a greater internal diameter. Alternatively, the first sealing element 91 can be placed inside a groove—not illustrated here—of the housing 80.

The terms "tighter supporting surface" and "wider supporting surface" herein each refer to the internal diameter. However, in an alternative—not illustrated—embodiment, the internal diameters can be the same or similar, so that the designations are then "first supporting surface" and "second supporting surface" (viewed from the gas inlet), for example.

The first sealing element 91 is a seal ring and specifically an X-ring.

Thus, the first sealing element 91 is a four lips seal and has a ring shape with a rectangular and especially square basic profile. As a result of the inwardly rounded sides of the rectangular basic profile, two radially circumferential abutment areas on the movement pin 64 emerge here.

A second sealing element 92 is located on the next section comprising another supporting surface 97.

The second sealing element 92 is, similarly to the first sealing element 91, also designed in a rotationally symmetrical manner and has a basic body 92', which extends here parallel to the longitudinal axis 64' of the movement body 64. At an—here graphically upper-end of the basic body 92', a sealing lip 92" is located which is designed and arranged in such a manner that it abuts the movement pin 64 circumferentially, forming a sharp angle with the longitudinal axis 64'. In this process, the free end of the sealing lip 92" is bent in opposition to the flow direction of the gas.

Thus, in section, the second sealing element 92 has roughly the form of the upper case letter M. The central area is advantageously directed against the gas flow direction.

The gas pushes—in this case graphically—from bottom to top. In this process, the first sealing element 91 with the two abutment areas initially acts through the form of the X-ring. If the gas, in the case of a defect, passes the first sealing element 91 and pushes it against the second sealing element 92, then the sealing lip 92" will be pressed upwards and thus precisely against the movement pin 64. The abutment area is even increased thereby and thus also the sealing effect of the second sealing element 92. Thus, in the case that the first sealing element 91 is defective, the gas passing through such a defective first sealing element 91 reinforces the sealing function of the second sealing element 92.

LIST OF REFERENCE NUMERALS

1 Pressure regulator
2 Safety device
3 Inertia mechanism
4 Reaction mechanism
5 Readjusting mechanism
30 Housing
31 Pit
32 Ball
33 Transfer pin
34 Spring, allocated to the transfer pin
40 Sliding punch
41 Internal component
41' Disc
41" Rib
41''' Angled plane
42 Mandrel
44 Spring, allocated to the internal component
45 External component
45' Front area of external component
45" Gorge in the central opening of the front area
46 Web of the external component
49 Longitudinal axis of the internal component
50 Pressure reduction stage
51 Pressure control stage
60 Membrane
61 Holding punch
62 Lever arm
62' Rotation axis
63 Sealing punch
64 Movement pin
64' Longitudinal axis of the movement pin
70 Rocker arrangement
80 Pressure regulator housing
90 Sealing arrangement
91 First sealing element
92 Second sealing element
92' Base body
92" Sealing lip
96 Tighter supporting surface
97 Wider supporting surface
99 Intermediate chamber
100 Gas inlet
101 Gas outlet
110 Duct

The invention claimed is:

1. A safety device for interrupting a gas flow within a gas-conducting device, the device comprising:
an inertia mechanism; and
a reaction mechanism,
wherein an inertia body of the inertia mechanism is configured to move from a resting position in case of an acceleration above a specifiable acceleration threshold value acting on the inertia body,
wherein the inertia mechanism is configured to activate the reaction mechanism due to the movement of the inertia body,
wherein when activated, the reaction mechanism is configured to interrupt the gas flow within the gas-conducting device,
wherein the safety device is free of gas flowing through it,
wherein the inertia mechanism has a pit in a housing for accommodating the inertia body,
wherein the inertia body is, in a normal state, in the resting position in the pit,
wherein the inertia mechanism has a transfer pin which, in the normal state, holds the inertia body in the resting position and which, in an activated state, prevents the inertia body from returning to the resting position,
wherein the safety device has a sliding punch,
wherein the sliding punch and the transfer pin are mechanically coupled to one another such that the sliding punch prevents, in the normal state, a movement of the transfer pin away from the pit.

2. The safety device of claim 1, wherein the inertia mechanism has a spring allocated to the transfer pin, and wherein the spring, in a tensioned state, exerts a force on the transfer pin, which is directed away from the pit.

3. The safety device of claim 1, wherein the sliding punch is designed and supported for movability, and wherein the sliding punch is configured to move the transfer pin in a direction of the pit when moving from the normal state to the activated state.

4. The safety device of claim 3, wherein the movement of the sliding punch is an overlapping of an axial movement and of a rotatory movement.

5. The safety device of claim 1, wherein the reaction mechanism has an internal component and an external component, wherein the internal component is arranged at least partly within the external component, wherein the internal component is arranged and designed for movability relative to the external component, wherein the sliding punch of the safety device follows a movement of the internal component, and wherein the internal component is in a cause-effect relationship with the transfer pin via the sliding punch such that at least a movement of the internal component has an effect on the transfer pin.

6. The safety device of claim 5, wherein the internal component and the sliding punch are integrally designed.

7. The safety device of claim 5, wherein the internal component is configured to make a movement at a transition from the normal state to the activated state which is an overlapping of an axial movement along a longitudinal axis of the internal component and of a rotatory movement around the longitudinal axis.

8. The safety device of claim 5, wherein, in the normal state, a spring allocated to the internal component exerts a force on the internal component, and wherein the inertia body, the transfer pin and the sliding punch prevent, in the normal state, the spring allocated to the internal component from moving the internal component.

9. The safety device of claim 5, wherein the internal component and the external component comprise ribs and corresponding gorges which allow an axial movement of the internal component relative to the external component.

10. The safety device of claim 9, wherein the ribs have angled planes on front ends of the ribs for transforming an axial force acting on the internal component into an axial and angular force.

11. The safety device of claim 10, wherein an angle of the angled planes serves to define the acceleration threshold value.

12. The safety device of claim 1, wherein the safety device has a readjusting mechanism such that an operator can reset the reaction mechanism from the activated state to the normal state via the readjusting mechanism.

13. The safety device of claim 12, wherein the readjusting mechanism is an axial extension of the internal component along a longitudinal axis of the internal component.

14. The safety device of claim 12, wherein the readjusting mechanism is configured to move along a longitudinal axis of the internal component for resetting in an axial direction.

15. The safety device of claim 1, wherein the gas-conducting device is a gas pressure regulator.

16. The safety device of claim 1, wherein the safety device and the gas-conducting device are connected to one another and form a joint arrangement.

17. The safety device of claim 1, wherein the gas-conducting device has a gas inlet, a gas outlet and a rotatably supported lever arm for pressure regulation, wherein the rotatably supported lever arm is mechanically coupled to a movement pin and a sealing punch, wherein the movement pin and the sealing punch are arranged within a housing and connected to the gas inlet such that a gas intruding via the gas inlet pushes against the movement pin and the sealing punch with balanced forces.

18. The safety device of claim 17, wherein the reaction mechanism of the safety device is mechanically coupled to a holding punch of the gas-conducting device, and wherein the holding punch is mechanically coupled to a membrane such that the holding punch has effects on the pressure regulation by the membrane.

\* \* \* \* \*